US006622015B1

United States Patent
Himmel et al.

(10) Patent No.: US 6,622,015 B1
(45) Date of Patent: Sep. 16, 2003

(54) METHOD AND APPARATUS FOR USING ELECTRONIC DOCUMENTS WITHIN A SMART PHONE

(75) Inventors: Maria Azua Himmel, Austin, TX (US); Herman Rodriguez, Austin, TX (US)

(73) Assignee: International Business Machines, Armonk, NY (US)

(*) Notice: Subject to any disclaimer, the term of this patent is extended or adjusted under 35 U.S.C. 154(b) by 0 days.

(21) Appl. No.: 09/240,960

(22) Filed: Jan. 29, 1999

(51) Int. Cl.[7] .............................................. H04M 3/42
(52) U.S. Cl. ....................... 455/414; 455/412; 455/422; 455/435
(58) Field of Search ............................... 455/410, 411, 455/418, 419, 450, 466, 412, 414, 435, 406, 558; 340/825.44, 825.27; 379/114.16, 91.01; 709/232, 231; 705/75, 76, 77, 26

(56) References Cited

U.S. PATENT DOCUMENTS

| 5,131,020 A | * | 7/1992 | Liebesny ..................... 455/422 |
| 5,426,422 A | * | 6/1995 | Vanden Heuvel et al. ........ 340/825.27 |
| 5,574,977 A | * | 11/1996 | Joseph et al. ................ 455/450 |
| 5,758,088 A | * | 5/1998 | Bezaire et al. ............... 709/232 |
| 6,049,272 A | * | 4/2000 | Lee et al. .................... 340/539 |
| 6,104,788 A | * | 8/2000 | Shaffer et al. ............. 379/93.17 |
| 6,119,014 A | * | 9/2000 | Alperovich et al. ......... 455/466 |
| 6,356,752 B1 | * | 3/2002 | Griffith ....................... 455/406 |
| 6,405,037 B1 | * | 6/2002 | Rossmann ................... 455/412 |

FOREIGN PATENT DOCUMENTS

| EP | 0793204 A2 | 9/1997 | ............. G07F/7/08 |
| EP | 0798650 A2 | 10/1997 | ........... G06F/15/02 |
| WO | WO96/32700 | 10/1996 | ............. G07F/7/08 |
| WO | WO98/26571 | 6/1998 | .......... H04M/15/00 |

* cited by examiner

*Primary Examiner*—Edward F. Urban
*Assistant Examiner*—Sonny Trinh
(74) *Attorney, Agent, or Firm*—Duke W. Yee; Jeffrey S. LaBaw; Stephen J. Walder, Jr.

(57) ABSTRACT

A method and apparatus for using electronic documents within a smart phone. A merchant, legal organization, or other entity provides an electronic document to a subscriber as proof of registration for a service or of legal entitlement. At the time of registration, the subscriber registers a phone number of a phone at which the subscriber desires to receive the issued electronic document. After the electronic document is created, the organization transmits the electronic document to the phone at the registered phone number. The receiving smart phone allows the subscriber to manage the electronic document within the smart phone.

25 Claims, 5 Drawing Sheets

| SMART PHONE APPLICATIONS | 601 |
|---|---|
| ☏ ADDRESS BOOK | 602 |
| ☏ CALCULATOR | 603 |
| ☏ CALENDAR | 604 |
| ☏ E-MAIL | 605 |
| ☏ NSP DIRECTIONS | 606 |
| ☏ VOICE MAIL | 607 |
| ☏ WALLET | 608 |

*FIG. 6A* 600

| SMART WALLET APPLICATIONS | 611 |
|---|---|
| WITHDRAW CASH FROM BANK | 612 |
| DEPOSIT CASH TO BANK | 613 |
| WALLET BALANCE INQUIRY | 614 |
| PAYMENT ACCESS NUMBER TRANSFER | 615 |

*FIG. 6B* 610

| E-DOCUMENTS | 621 |
|---|---|
| ☐ REMINDERS | 622 |
| ☐ SEARCH | 623 |
| ☐ TRANSFER | 624 |
| ☐ VIEW | 625 |

*FIG. 6C* 620

| E-DOCUMENT-TRANSFER | 631 |
|---|---|
| ✓ ACCEPT | 632 |
| ✓ POSTPONE | 633 |
| ✓ REJECT | 634 |

*FIG. 6D* 630

METHOD AND APPARATUS FOR USING ELECTRONIC DOCUMENTS WITHIN A SMART PHONE

CROSS-REFERENCE TO RELATED APPLICATIONS

The present application is related to application Ser. No. 09/240,958, filed Jan. 29, 1999, titled "Method and Apparatus for Transmitting and Tendering Electronic Cash Using a Smart Wallet," herein incorporated by reference.

BACKGROUND OF THE INVENTION

1. Technical Field

The present invention relates generally to an improved data processing system and, in particular, to an improved method and apparatus for providing data in a distributed data processing system. Still more particularly, the present invention relates to a method and apparatus for using electronic documents within a smart phone.

2. Description of Related Art

The use of computers has become more and more pervasive in society. This pervasiveness includes the integration of personal computer technology into phones. By utilizing computer technology, users or callers have access to computing functions and resources in a personal, portable device. In addition, it is envisioned that phone users would be able to use some of the same software elements in a phone that are used at home or in the office. Various applications have been developed and are being developed for use in phones. These applications generally include communication applications to help a user stay in touch with other persons at home or in the office, such as voice mail, e-mail, or two-way paging with short text messages. Some phones incorporate so-called personal information manager(PIM) technology, such as an address book or a calendar for scheduling personal events. PIMs on a phone, on a home PC, and on an office PC may be synchronized to keep all information consistent and current.

Another adopted computer technology for use on a phone is voice and speech recognition. Voice recognition technology is already well developed in multimedia desktop personal computers and, when incorporated into a phone, allows a phone user to easily control and interact with a telephone application, such as automatically dialing a phone number, while obviating the need for manual input. Phones are becoming so ubiquitous that many people carry their phones so that they have some means for being in constant communication contact with others. Examples of common use of portable phones include carrying and using a phone within an automobile or possibly carrying the phone while shopping in a mall.

An attempt has been made recently to use smart cards as a depository for identity information. A smart card is generally a small circuit board with built-in logic, firmware, and storage that provides the smart card with some kind of independent decision-making ability. Typically, a smart card is a credit-card-sized device that contains integrated circuits with limited amounts of "intelligence".

Smart cards are expected to be used as personal identification devices in a wide range of applications and hardware devices. In such an environment, it would be unnecessary to have a separate smart card for every particular application or hardware device. In such an environment, a single smart card could be used to identify a specific user and to provide user identification for a variety of devices. A user may insert a smart card containing personal information into a smart card reader or device that interfaces with a larger computing system.

By storing special software on a smart card, it has been envisioned that an owner of a smart card would possess an easily transportable physical device containing several abilities, e.g., a replacement for passwords and identity badges.

As the economy grows and jobs become more specialized, services have been created which provide conveniences for the public. When a customer registers for new service, the customer generally receives at least an account number but frequently also receives some type of card to provide visual proof that the customer should be granted a particular service. As these service cards proliferate, it becomes inconvenient to carry these cards at all times.

For example, it is not uncommon for a person to carry a card for the following services: frequent flyer programs with airlines, frequent buyer programs with grocery stores, movie rental stores, and discount price outlet stores. These cards are in addition to the more important legal documents which one usually carries in a wallet: health insurance card, automobile insurance card, Social Security card, and driver's license. In addition, many people carry the following financial-type documents: credit cards, phone cards, automated teller machine (ATM) cards, etc. It would not be uncommon for a person to also be carrying the following items: tickets to events, passes to amusement parks, telebroker cards, etc.

It would be convenient to incorporate electronic document technology for all these types of documents into a single electronic device. However, smart card technology has been developing very slowly, while personal phones have been improved and adopted very rapidly.

Therefore, it would be advantageous to have an improved method and apparatus for using electronic documents within a smart phone since the public already uses personal phones ubiquitously.

SUMMARY OF THE INVENTION

The present invention provides a method and apparatus for using electronic documents within a smart phone. A merchant, legal organization, or other entity provides an electronic document to a subscriber as proof of registration for a service or of legal entitlement. At the time of registration, the subscriber registers a phone number of a phone at which the subscriber desires to receive the issued electronic document. After the electronic document is created, the organization transmits the electronic document to the phone at the registered phone number. The receiving smart phone allows the subscriber to manage the electronic document within the smart phone.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A–6D are example displays of a user interface that may be provided to a user of a smart phone for managing e-documents;

FIG. 8 is a diagram that depicts an example display of a user interface window for actions on reminders.

DETAILED DESCRIPTION OF THE PREFERRED EMBODIMENT

Figure 1:
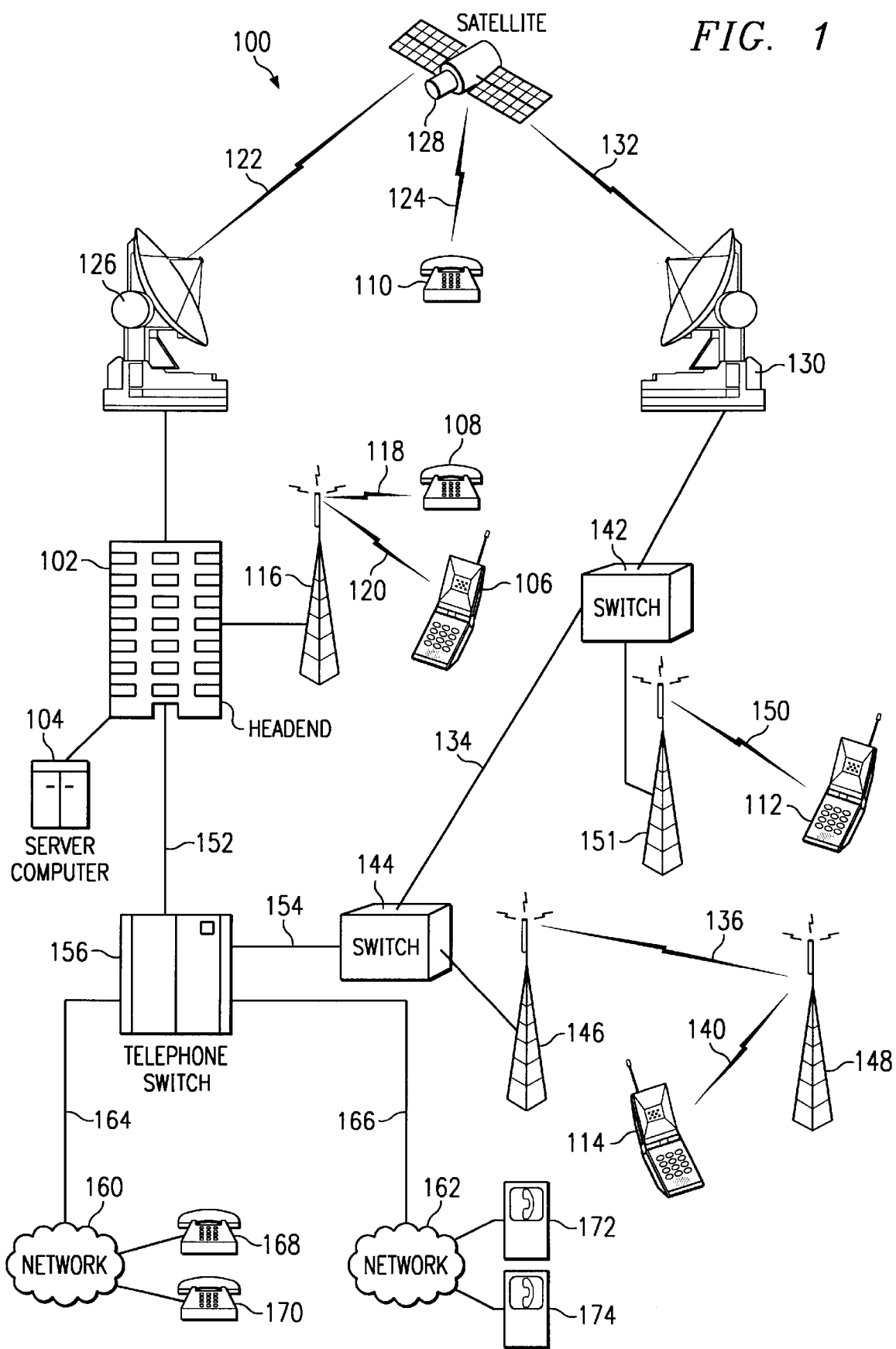
FIG. 1 is a diagram of a computing system in accordance with a preferred embodiment of the present invention.

With reference now to the figures and in particular with reference to FIG. 1, a diagram of a computing system 100 is depicted in accordance with a preferred embodiment of the present invention. In this example, head-end 102 is connected to a server computer 104, which is employed to collect data from various phones that may be present within computing system 100. In particular, server computer 104 may communicate with various phone units 106–114 and 168–174. These phones may contain a computing platform that may communicate with server 104 as so-called "smart phones". In this example, communications between various phone units may be accomplished through the standard telephone system, a cellular phone system, the Iridium™ satellite phone system, or other wireless systems.

Communication between server computer 104 and phone units 106–114 is accomplished in a number of different ways in this example. For example, radio tower 116 provides communications links 118 and 120 to phone units 108 and 106 respectively. Communications links 118 and 120 are radio frequency communications links generated between radio tower 116 and antennas located on phone units 106 and 108. Phone unit 108 may be a dual-use phone that may be used with both a satellite and cell-phone tower. In addition, server 104 may communicate with phone unit 110 through communications links 122 and 124. Communications link 122 is established between satellite disk 126 and satellite switch 128 with communications link 124 being established between satellite 128 and phone unit 110. Communications links 122 and 124 are radio frequency based links generated by signals sent to satellite switch 128 from satellite dish 126 and from satellite switch 128 to phone unit 110. In this example, radio tower 116 and satellite dish 126 are connected to head-end 102 and provide for transmissions originating from or passing through head-end 102.

Further, signals may be sent from satellite switch 128 to satellite dish 130 via communications link 132. From satellite dish 130, information may be sent to phone unit 114 through communications links 134, 136, and 140. Communications link 134 in this example is a link between switch 142 and switch 144. In this manner, a path may be established from server computer 104 to phone unit 114 to create a path containing communications links 122, 132, 134, 136, and 140. Communications link 134 is a physical link, which may be for example, coaxial cable, fiber optic cable, or a combination of the two. Each switch also has a "link", also called a "path", within the switch for routing data through the switch. An "input link" is the input or source portion of the link associated with the input into the switch, and an "output link" is the output or destination portion of the link associated with the output from the switch. Communications link 136 is established between radio towers 146 and 148. Radio tower 146 is connected to switch 144 in FIG. 1. Communications link 140 is established between radio tower 148 and phone unit 114. Communications with mobile unit 112 may be established through a path containing communications links 122, 132, and 150. Communications link 150 is established between radio tower 151 and phone unit 112. In this example, satellite dish 130 and radio tower 151 are connected to switch 142.

In addition, server computer 104 may use an alternate path to communicate with phone unit 114. For example, a path through communications links 152, 154, 136, and 140 may be employed to communicate with phone unit 114. Links 152 and 154 are physical links in this example. Communications link 152 is established between head-end 102 and switch 156, while communications link 154 is established between switch 156 and switch 144. In this manner, data signals, such as multimedia data, which may include video, graphics, voice, and text may be sent between server computer 104 and phone units 106–114. These data signals may also include GPS signal and navigation-type data.

In addition, computing system 100 also includes networks 160 and 162, which are in communication with server computer 104. Network 160 has a communications path to server computer 104 via communications links 164 and 152. Network 162 communicates with server computer 104 through communications links 166 and 152. Various phone facilities may be located within networks 160 and 162. For example, in FIG. 1, standard telephones 168 and 170 are located within network 160, while phone booths 172 and 174 are located within network 162. Of course, other facilities may be located within networks 160 or 162, such as PCs using Internet telephony.

Information may be obtained from phones 168–174 and sent to server computer 104. This information may include any information necessary for a navigation device to generate directions to or from these locations. Server 104 may poll networks 160 and 162 to obtain this information or the information may be pushed to server 104 from the networks.

Figure 2:
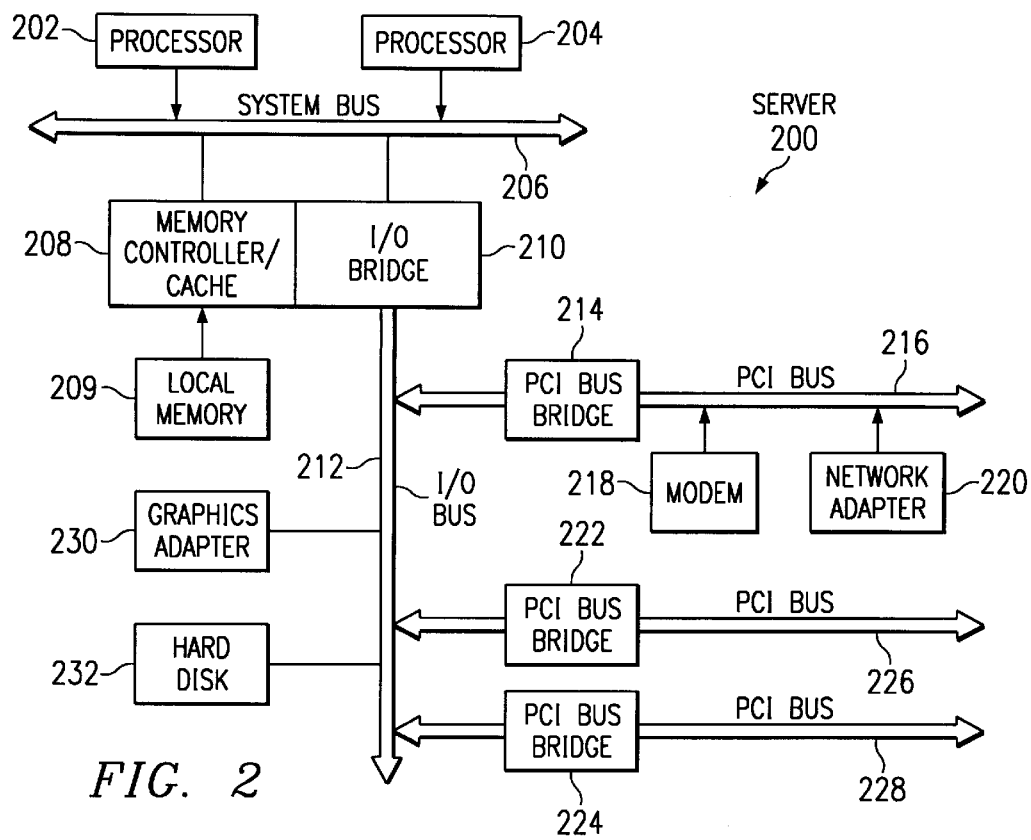
FIG. 2 is a block diagram of a data processing system, which may be implemented as a server, in accordance with a preferred embodiment of the present invention.

Referring to FIG. 2, a block diagram depicts a data processing system, which may be implemented as a server, such as server computer 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 318–220 may be connected to PCI bus 216. Typical PCI bus implementations will support four PCI expansion slots or add-in connectors. Communications links to various mobile units illustrated in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple networks computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as an optical disk drive and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
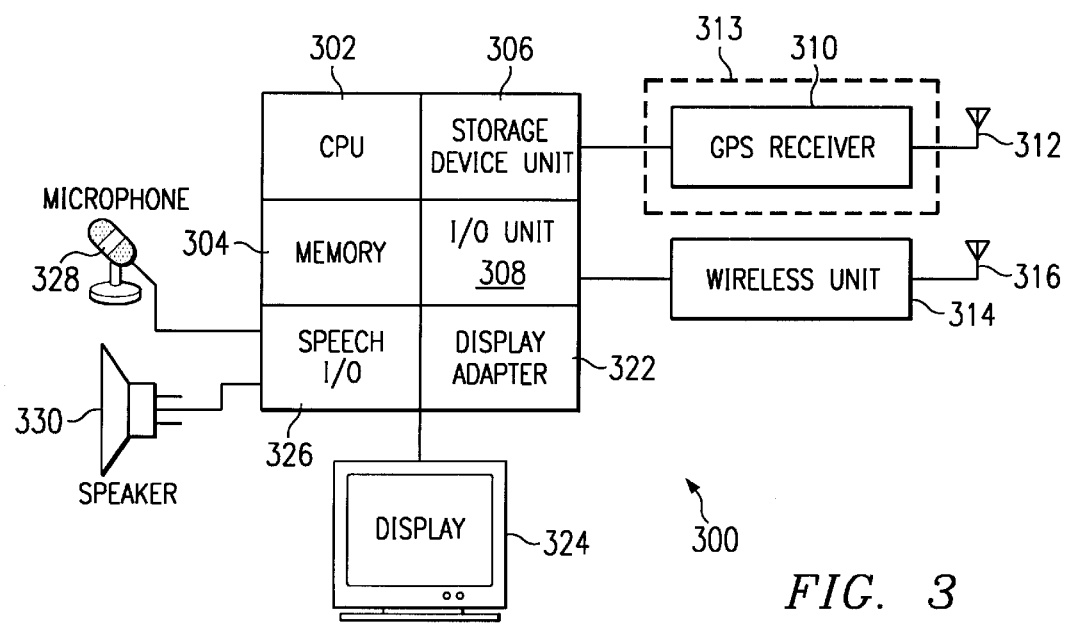
FIG. 3 is a block diagram of a wireless phone computing platform in accordance with a preferred embodiment of the present invention.

Turning next to FIG. 3, a block diagram of a wireless phone computing platform is depicted in accordance with a preferred embodiment of the present invention. Computing platform 300 is located within a cell phone, mobile phone, satellite phone, or other type of digital smart phone. Computing platform 300 includes a CPU 302, which may be an embedded processor or processor such as a Pentium processor from Intel Corporation. "Pentium" is a trademark of Intel Corporation. Computing platform 300 also includes memory 304, which may take the form of random access memory (RAM) and/or read only memory (ROM).

Computing platform 300 also contains a storage device unit 306. Storage device unit 306 may contain one or more portable storage devices, e.g., a hard disk drive, such as an IBM MicroDrive, or a flash memory card. Wireless phone computing platform 300 also includes an input/output (I/O) unit 308, which provides connections to various I/O devices. In this example, a GPS receiver 310 is optionally included, as denoted by dotted line 313, within wireless phone computing system 300 and receives signals through antenna 312. Wireless unit 314 provides for two-way communications between computing unit 300 and another data processing system, such as server 104 in FIG. 1, through antenna 316.

Computing unit 300 also includes a display adapter 322, which is connected to display 324. This display may be a touch screen display or an LCD display. Computing unit 300 also includes a microphone 328 and a speaker 330 which provide a user, in addition to standard voice communication, with an ability to enter commands and receive responses through speech I/O unit 326 without having to constantly divert attention to display 324.

Figure 4:
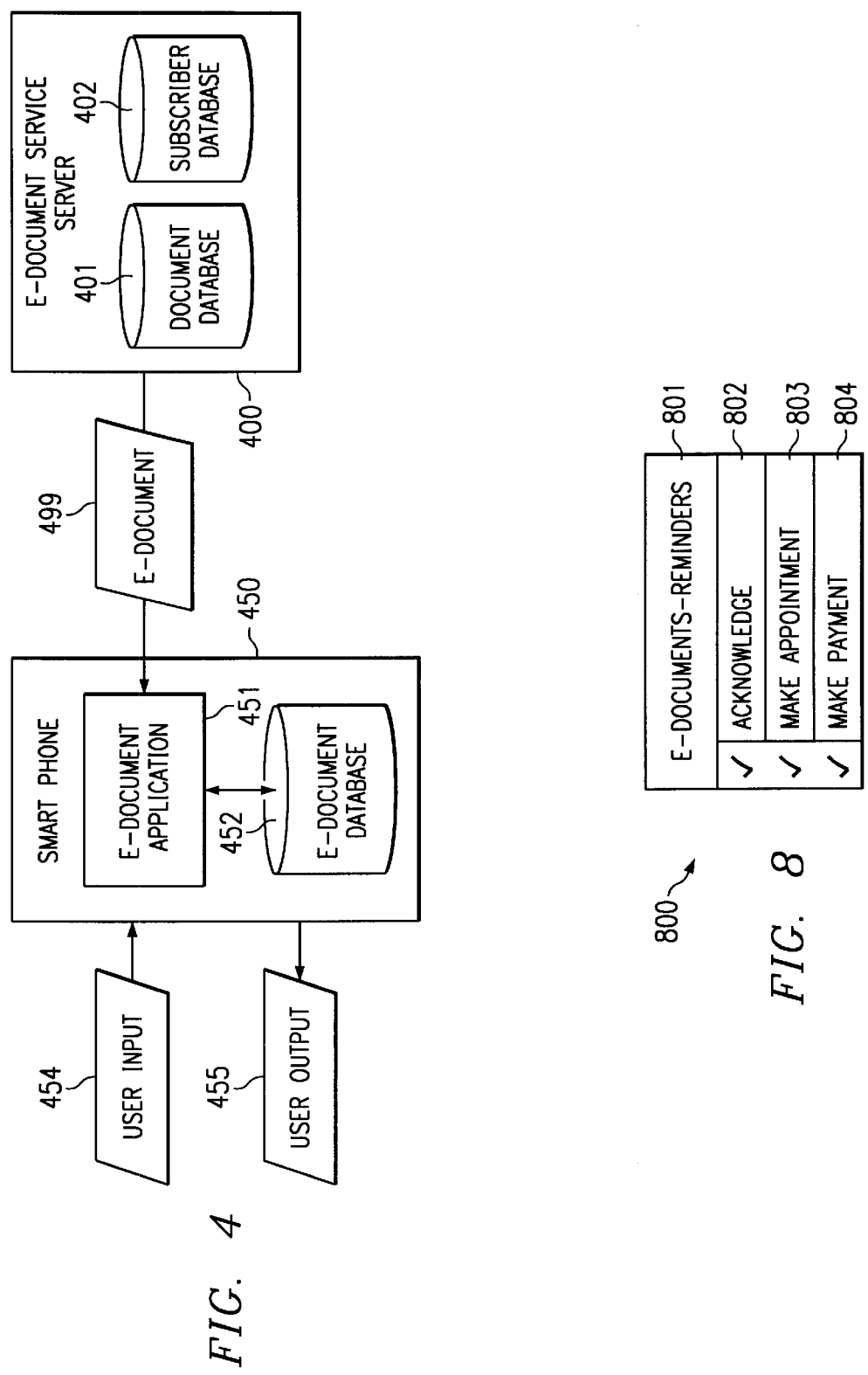
FIG. 4 is a block diagram of an overall view of a data processing system for publishing and transmitting electronic documents.

With reference now to FIG. 4, a block diagram depicts an overall view of a data processing system for publishing and transmitting electronic documents according to the method of the present invention. Smart phone 450 accepts user input 454 and provides user output 455 through a user interface that allows a user of smart phone 450, acting as a subscriber of an e-document service, to browse and manage electronic documents stored on smart phone 450. Smart phone 450 contains e-document database 452 that is accessed by e-document application 451 for storing and retrieving e-documents for the subscriber. E-document application 451 may be a Java™ application or applet executing on a Java Virtual Machine (JVM) on smart phone 450, an application running under Windows™ CE, or similar application. E-document application 451 receives e-document 499 from e-document service server 400. E-document application 451 also receives reminders for subscriber actions associated with e-document 499 from the e-document service.

E-document service server 400 contains document database 401 and subscriber database 402 for storing and managing electronic documents created by the e-document service for its subscribers. Other databases not shown in the figure may be used by the e-document service in an enterprise data processing system.

Each merchant or provider of consumer services may become its own e-document service. Usually, a consumer or customer registers for a particular service in person and waits several minutes or longer to receive a document that provides proof of registration. For example, when a consumer registers at a discount buyers club, the consumer usually receives an identity card with a small picture. Rather than issuing a physical card, a consumer may receive an electronic document that serves the same purpose. In this case, the discount buyers club would issue an e-document in its capacity as an e-document service.

Alternatively, each merchant or provider or consumer services may contract with a third-party for its e-document service requirements. In this case, the consumer may register with a merchant or other organization yet receive his e-document from a third-party vendor. In the following examples, it is assumed that a merchant, a service provider, an individual, an organization, or a governmental agency may be considered to be an e-document service with respect to the capacity of issuing documents.

Figure 5:
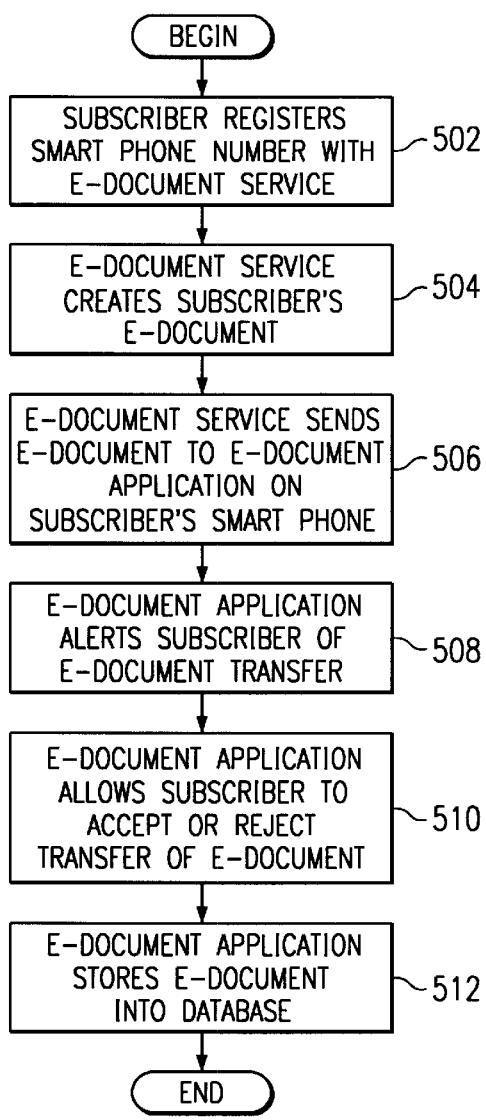
FIG. 5 is a flowchart that depicts a method of creating and transmitting electronic documents.

With reference now to FIG. 5, a flowchart depicts a method of creating and transmitting electronic documents. At some point in time, a subscriber requires the services of the e-document service, and the subscriber registers the subscriber's smart phone number with the e-document service (step 502). In response to the request for an electronic document, the e-document service creates the subscriber's e-document (step 504). The e-document service sends e-document 499 to e-document application 451 on subscriber's smart phone 450 at the phone number supplied at the time of registration (step 506). E-document application 451 alerts the subscriber to the attempted transfer of e-document 499 (step 508). E-document application 451 allows the subscriber to accept or reject the transfer of e-document 499 (step 510). E-document application 451 then stores e-document 499 into e-document database 452 if the subscriber accepts the e-document (step 512).

For example, the e-document service may be a governmental agency that issues a driver's license. When one registers and passes an exam for a driver's license, one must provide personal information, such as an address, etc. At the same time, one may provide a smart phone number to which the driver's license, in the form of an e-document, should be transmitted. After the driver's license bureau has created the driver's license in the form of an e-document, it transmits the driver's license e-document to the subscriber's smart phone. The transmission of the e-document is both quicker and more secure than sending a physical document through regular postal mail.

With reference now to FIGS. 6A–6D, diagrams show example displays of a user interface that may be provided to a user of a smart phone for managing e-documents. In FIG. 6A, display 600 has title 601 of "Smart Phone Applications" showing the applications available to the user of smart phone 450: Address Book 602, Calculator 603, Calendar 604, E-Mail 605, NSP Directions 606, Voice Mail 607, and Wallet 608. The applications activated by the menus E-Mail 605 and Voice Mail 607 provide well-known communication tools. The applications activated by the menu items Address Book 602, Calculator 603, and Calendar 604 are PIM applications similar to well-known personal information management applications. NSP Directions 606 is a navigation service provider application for obtaining directions between locations, such as that disclosed in U.S. application Ser. No. 09/240,965, "Method and Apparatus for Providing and Obtaining Routing Information Through Phone-Based Navigation", herein incorporated by reference.

In FIG. 6B, display 610 shows menu 611 titled "Smart Wallet Application" that provides user access to electronic wallet applications that replicate functions similar to a traditional wallet. Cash 612, Coupons 613, E-documents 614, and Pictures 615 store electronic items in databases within smart phone 450. Cash 612 is an electronic cash application, such as that disclosed in U.S. application Ser. No. 09/240,958, "Method and Apparatus for Transmitting and Tendering Electronic Cash Using a Phone Wallet", herein incorporated by reference. Coupons 613 is an electronic coupon application for managing electronic coupons, such as that disclosed in U.S. application Ser. No. 09/240, 963, "Method and Apparatus for Phone-Based Receipt and Redemption of electronic Coupons", herein incorporated by reference. Pictures 615 may provide a browser for viewing digital pictures.

In FIG. 6C, display 620 shows menu 621 titled "E-documents". Reminder 622, Search 623, Transfer 624, and View 625 provide various actions that may be performed on e-documents stored within e-document database 452. Reminder 622 allows the subscriber of the e-documents to the view and manage subscriber reminders associated with the e-documents stored in e-document database 452. Search 623 allows the subscriber to search through the stored e-documents. Transfer 624 allows the subscriber to transfer or retrieve an e-document from an e-document service. View 625 allows the subscriber to browse and view the e-documents stored on smart phone 450.

View 625 and Pictures 615 may perform similar functions. Depending upon the manner in which the subscriber manages and categorizes the e-documents, View 625 may provide browsing functions for legal documents, such as a driver's license, while Pictures 615 provides browsing functions solely for digital pictures. However, the digital pictures may be received from an e-document service. For example, a consumer/subscriber may drop off a roll of film at a film developer, and at the same time, the customer may register his smart phone number. After the film is developed, the film developer, acting in its own capacity as an e-document service, may transmit scanned photos as e-documents to the consumer/subscriber. The consumer/subscriber may or may not accept the transmittal of the pictures as e-documents, yet the consumer/subscriber has been notified that the service has been completed.

In FIG. 6D, display 630 shows menu 631 titled "E-Document-Transfer". Accept 632, Postpone 633, and Reject 634 provide various actions that may be applied to the immediate transfer of e-document 499 from e-document service server 400. If the subscriber accepts the e-document, it is stored in e-document database 452. Although it may be assumed that the subscriber has requested the e-document, the rejection option may provide a security feature so that the subscriber can reject e-documents that do not appear to be legitimate. In addition, there may be services that a subscriber later decides are undesirable, and the subscriber has the option of declining a previous registration.

Figure 7:
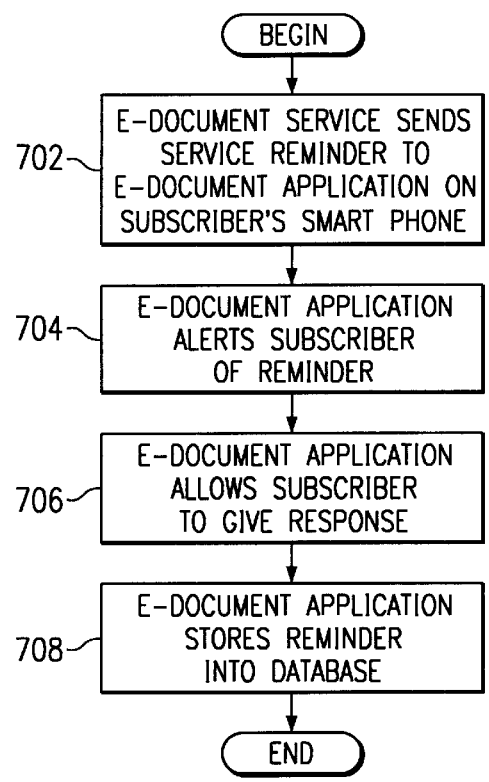
FIG. 7 is a flowchart that depicts the use of reminders with associated e-documents.

With respect to FIG. 7, a flowchart depicts the use of reminders with associated e-documents. E-document service server 400 sends a service reminder to e-document application 451 on subscriber's smart phone 450 (step 702). E-document application 451 alerts the subscriber of the reminder (step 704). E-document application 451 then allows the subscriber to input an appropriate response (step 706). E-document application 451 then stores the reminder, if necessary, into e-document database 452 (step 708).

With reference now to FIG. 8, a diagram shows an example display of a user interface window for actions on reminders. Display 800 shows menu 801 titled "E-documents-Reminders". Acknowledge 802, Make Appointment 803, and Make Payment 804 provide various actions that may be applied to previously stored or incoming reminders. Acknowledge 802 allows the subscriber to merely acknowledge that the reminder has been received. Make Appointment 803 may initiate the execution of the application associated with Calendar 604 for making an appointment associated with a particular e-document. Make Payment 804 may initiate the execution of the application associated with Cash 612 for making a payment, or possibly regularly scheduled payments, for the completion of a service to which one has subscribed.

As a further example of the usefulness of e-documents, an individual may provide a smart phone number to another individual so an appointment or calendar event can be sent as an e-document. The owner of the smart phone may receive the calendar e-document from a friend as a reminder to attend a social event, or the owner of the smart phone may receive a reminder of a dentist appointment from a dentist. Calendar 604 can then enter the e-document into the calendar on the smart phone.

Many documents have associated dates by which time some related action should occur. For some services that have issued documents, a merchant will send a reminder notice by postal mail that the subscriber should perform some action by a specific time. With the method of the present invention, the e-document service has the ability to send a reminder to the same smart phone number to which the e-document service originally sent an e-document.

For example, a driver's license has an associated expiration data. However, one usually does not allow this data to lapse. A driver's license bureau, acting in its capacity as an e-document service, may send a reminder to a subscriber that the subscriber is due for a vision test before the subscriber's driver's license can be renewed.

As a security feature, if the phone is lost, smart phone 450 may have several different types of security features to ensure the safety of any valuable information within the phone. For example, E-document application 451 may have a special override feature that deletes or invalidates all of the e-documents on smart phone 450 when a special override e-document is sent to smart phone 450.

The advantages provided by the electronic documents of the present invention are apparent with reference to the detailed description of the figures given above. In the electronic documents of the present invention, the subscriber is not inconvenienced by physically carrying multiple cards and documents for various services. The subscriber may carry as many electronic documents as the e-document application in the subscriber's smart phone will allow, and the e-document application automatically manages the e-document and also alerts the subscriber of reminders associated with the e-documents. Moreover, the management of the documents may be integrated into other applications residing on the smart phone, such as an electronic payment application or a calendar application. The electronic documents of the present invention ensure that a subscriber can always carry documents with a smart phone that the subscriber would already be carrying otherwise. The subscriber also does not need to worry about losing the smart phone that may contain legal documents and electronic cash as electronic security features may be incorporated into the smart phone. These security features may also deter theft of the smart phone.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for distributing an electronic personal identification card, the method comprising:
    registering a wireless communication device which is to receive an electronic personal identification card, the electronic personal identification card including personal identification information which specifically identifies an individual user and which corresponds to a particular benefit or legal right provided to the individual user; and
    sending the electronic personal identification card to the wireless communication device via a wireless communications link, wherein the electronic personal identification card is stored within a memory of the wireless communication device, wherein the method is performed in a communication systems and the particular benefit is a benefit that is provided to the user outside of the communication system.

2. The method of claim 1, further comprising:
    sending a reminder message to the wireless communication device, the reminder message being associated with the electronic personal identification card and including subject matter associated with the benefit or legal right provided to the individual user.

3. The method of claim 1, wherein the electronic personal identification card is a license to engage in a particular activity.

4. The method of claim 1, wherein the electronic personal identification card is a membership card that identifies the individual user as a part of a group of users that are each provided with the same benefit or legal right.

5. The method of claim 1, wherein registering the wireless communication device includes receiving a phone number associated with the wireless communication device.

6. The method of claim 1 further comprising alerting a user of the wireless communication device of a receipt of the electronic personal identification card.

7. The method of claim 1 further comprising alerting a user of the wireless communication device of an attempted transfer of the electronic personal identification card to the wireless communication device.

8. The method of claim 1 further comprising providing a user of the wireless communication device with an ability to reject a transfer of the electronic personal identification card to the wireless communication device.

9. The method of claim 1 further comprising sending an electronic document to the wireless communication device that deletes or invalidates any electronic personal identification cards previously stored in the wireless communication device.

10. An apparatus for distributing an electronic personal identification card, comprising:
    means for registering a wireless communication device which is to receive an electronic personal identification card, the electronic personal identification card including personal identification information which specifically identifies an individual user and which corresponds to a particular benefit or legal right provided to the individual user; and
    means for sending the electronic personal identification card to the wireless communication device via a wireless communications link, wherein the electronic personal identification card is stored within a memory of the wireless communication device, wherein the method is performed in a communication systems and the particular benefit is a benefit that is provided to the user outside of the communication system.

11. The apparatus of claim 10, further comprising:
    means for sending a reminder message to the wireless communication device, the reminder message being associated with the electronic personal identification card and including subject matter associated with the benefit or legal right provided to the individual user.

12. The apparatus of claim 10, wherein the electronic personal identification card is a license to engage in a particular activity.

13. The apparatus of claim 10, wherein the electronic personal identification card is a membership card that identifies the individual user as a part of a group of users that are each provided with a same benefit or legal right.

14. The apparatus of claim 10, wherein the means for registering the wireless communication device includes means for receiving a phone number associated with the wireless communication device.

15. The apparatus of claim 10, further comprising means for alerting a user of the wireless communication device of an attempted transfer of the electronic personal identification card to the wireless communication device.

16. The apparatus of claim 10, further comprising means for sending an electronic document to the wireless communication device that deletes or invalidates any electronic personal identification cards previously stored in the wireless communication device.

17. A computer program product in a computer readable medium for distributing an electronic personal identification card, comprising:
    first instructions for registering a wireless communication device which is to receive an electronic personal identification card, the electronic personal identification card including personal identification information which specifically identifies an individual user and which corresponds to a particular benefit or legal right provided to the individual user; and
    second instructions for sending the electronic personal identification card to the wireless communication device via a wireless communications link, wherein the electronic personal identification card is stored within a memory of the wireless communication device, wherein the method is performed in a communication systems and the particular benefit is a benefit that is provided to the user outside of the communication system.

18. The computer program product of claim 17, further comprising:
   third instructions for sending a reminder message to the wireless communication device, the reminder message being associated with the electronic personal identification card and including subject matter associated with the benefit or legal right provided to the individual user.

19. The computer program product of claim 17, wherein the electronic personal identification card is a license to engage in a particular activity.

20. The computer program product of claim 17, wherein the electronic personal identification card is a membership card that identifies the individual user as a part of a group of users that are each provided with a same benefit or legal right.

21. The computer program product of claim 17, wherein the first instructions for registering the wireless communication device include instructions for receiving a phone number associated with the wireless communication device.

22. The computer program product of claim 17, further comprising third instructions for alerting a user of the wireless communication device of a receipt of the electronic personal identification card.

23. The computer program product of claim 17, further comprising third instructions for alerting a user of the wireless communication device of an attempted transfer of the electronic personal identification card to the wireless communication device.

24. The computer program product of claim 17, further comprising third instructions for providing a user of the wireless communication device with an ability to reject a transfer of the electronic personal identification card to the wireless communication device.

25. The computer program product of claim 17, further comprising third instructions for sending an electronic document to the wireless communication device that deletes or invalidates any electronic personal identification cards previously stored in the wireless communication device.

* * * * *

UNITED STATES PATENT AND TRADEMARK OFFICE
CERTIFICATE OF CORRECTION

PATENT NO. : 6,622,015 B1
DATED : September 16, 2003
INVENTOR(S) : Himmel et al.

It is certified that error appears in the above-identified patent and that said Letters Patent is hereby corrected as shown below:

Column 6,
Line 18, after "provider", delete "or" and insert -- of --.

Column 8,
Lines 39-40, after "expiration", delete "data" aned insert -- date --.

Column 9,
Line 60, after "with", delete "the" and insert -- a --.

Signed and Sealed this

Twelfth Day of October, 2004

JON W. DUDAS
*Director of the United States Patent and Trademark Office*